(12) United States Patent
Peterman

(10) Patent No.: US 7,787,857 B2
(45) Date of Patent: Aug. 31, 2010

(54) METHOD AND APPARATUS FOR PROVIDING AN ALERT UTILIZING GEOGRAPHIC LOCATIONS

(75) Inventor: Glenn T. Peterman, Overland Park, KS (US)

(73) Assignee: Garmin Ltd. (KY)

( * ) Notice: Subject to any disclaimer, the term of this patent is extended or adjusted under 35 U.S.C. 154(b) by 922 days.

(21) Appl. No.: 11/423,641

(22) Filed: Jun. 12, 2006

(65) Prior Publication Data

US 2007/0288157 A1 Dec. 13, 2007

(51) Int. Cl.
*H04M 1/00* (2006.01)
(52) U.S. Cl. .............. 455/404.1; 455/404.2; 455/456.1
(58) Field of Classification Search .......... 455/404.1–2, 455/412.1, 456.1, 456.3, 9; 340/426.19, 340/426.2, 426.22, 539.13
See application file for complete search history.

(56) References Cited

U.S. PATENT DOCUMENTS

| | | | | |
|---|---|---|---|---|
| 5,497,149 | A * | 3/1996 | Fast | 340/988 |
| 6,066,075 | A | 5/2000 | Poulton | 482/8 |
| 6,625,457 | B1 * | 9/2003 | Raith | 455/456.1 |
| 6,747,555 | B2 * | 6/2004 | Fellenstein et al. | 340/524 |
| 6,959,207 | B2 * | 10/2005 | Keinonen et al. | 455/567 |
| 7,015,817 | B2 | 3/2006 | Copley et al. | 340/573.4 |
| 7,261,691 | B1 * | 8/2007 | Asomani | 600/300 |
| 7,289,812 | B1 * | 10/2007 | Roberts et al. | 455/456.1 |
| 2002/0137552 | A1 * | 9/2002 | Cannon et al. | 455/567 |
| 2004/0002843 | A1 * | 1/2004 | Robarts et al. | 703/13 |
| 2004/0021567 | A1 * | 2/2004 | Dunn | 340/539.13 |
| 2005/0068169 | A1 * | 3/2005 | Copley et al. | 340/539.13 |
| 2005/0277452 | A1 * | 12/2005 | Pasamba | 455/575.6 |
| 2006/0158329 | A1 * | 7/2006 | Burkley et al. | 340/539.13 |
| 2008/0027679 | A1 * | 1/2008 | Shklarski | 702/182 |

OTHER PUBLICATIONS

Printout from http://www.roadid.com/id.asp. 3 pages, (printed Jun. 12, 2006).
Meyers, Michelle, "Unconscious jogger identified through iPod", http://msn-cnet.com.com/2061-10793_3-6046059. html?part+rss &tag=6046059&subj=news, CNET News, 5 pages, (Mar. 4, 2006).
International Search Report from corresponding International Application No. PCT/US2006/023803, dated Dec. 31, 2008.

* cited by examiner

*Primary Examiner*—CongVan Tran
(74) *Attorney, Agent, or Firm*—Samuel M. Korte

(57) ABSTRACT

Embodiments of the present invention provide a navigation device (10) and method that are operable to provide an alert by comparing user geographic locations. The navigation device (10) generally includes a location determining component (14) operable to determine a current geographic location of the device (10), a memory (16) operable to store data corresponding to a previous geographic location of the device (10), a processor (12), and a display (20). The processor (12) is operable to compare the current geographic location of the device (10) to the previous geographic location of the device (10) and generate an alert based upon the comparison. The display (20) is operable to provide a visual indication of the generated alert. Such a configuration enables an attention-getting alert to be automatically provided even if a user is severely injured or incapacitated.

20 Claims, 7 Drawing Sheets

METHOD AND APPARATUS FOR PROVIDING AN ALERT UTILIZING GEOGRAPHIC LOCATIONS

BACKGROUND OF THE INVENTION

1. Field of the Invention

The present invention relates to apparatuses and methods for providing alerts. More particularly, the invention relates to a navigation device and method that are operable to provide an alert by comparing user geographic locations.

2. Description of the Related Art

Joggers, bikers, hikers, and other exercisers often exercise alone due to time constraints or the lack of available exercise partners. Exercisers often wear ID tags or bracelets that include important contact and medical information in the event of injury or incapacitation. Unfortunately, ID tags and bracelets are ineffective at notifying others of injured exercisers due to their limited ability to attract attention. For instance, an ID tag is unlikely to alert a passerby to the location of an injured exerciser. Further, cellular phones, even if carried during exercise, are of little use to exercisers who have suffered severe injuries or who have otherwise been incapacitated. Thus, exercisers lack an effective method of alerting others in the event of serious injury.

SUMMARY OF THE INVENTION

The present invention solves the above-described problems and provides a distinct advance in the art of providing alerts. More particularly, the invention provides a navigation device and method that are operable to provide an alert by comparing user geographic locations. Such a configuration enables an attention-getting alert to be automatically provided even if the user is severely injured or incapacitated.

In one embodiment, the present invention provides a wearable navigation device including a location determining component operable to determine a current geographic location of the device, a memory operable to store data corresponding to a previous geographic location of the device, a processor, and a display. The processor is operable to compare the current geographic location of the device to the previous geographic location of the device and generate an alert based upon the comparison. The display is operable to provide a visual indication of the generated alert. For example, if the user falls down and cannot move, the processor will generate an alert due to the geographic location comparison and the display will alert others to the location of the user.

In another embodiment, the wearable navigation device includes a location determining component operable to determine a current geographic location of the device, a memory operable to store data corresponding to a previous geographic location of the device, a processor, a display, and a user interface operable to receive a status input from a user. The wearable navigation device also includes a housing to enable the device to be worn on the user's arm. The processor is operable to compare the current geographic location of the device to the previous geographic location of the device to determine if the current geographic location is within a predetermined range from the previous geographic location. If the current geographic location is within the predetermined range from the previous geographic location, the processor is operable to generate a prompt for the status input and the display is operable to present a visual indication of the prompt. If the status input is not received within a predetermined time after prompting, the processor is operable to generate an alert and the display is operable to present a visual indication of the alert. The visual indication of the alert provided by the display includes a flashing message selected from the group consisting of user contact information, user medical information, first responder instructions, suggested user actions, and combinations thereof.

In another embodiment, the present invention provides a method of providing an alert. The method generally includes acquiring a current geographic location of a user, comparing the current geographic location of the user to a previously acquired geographic location of the user, generating an alert based upon the comparison of the geographic locations, and providing a visual indication of the generated alert.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
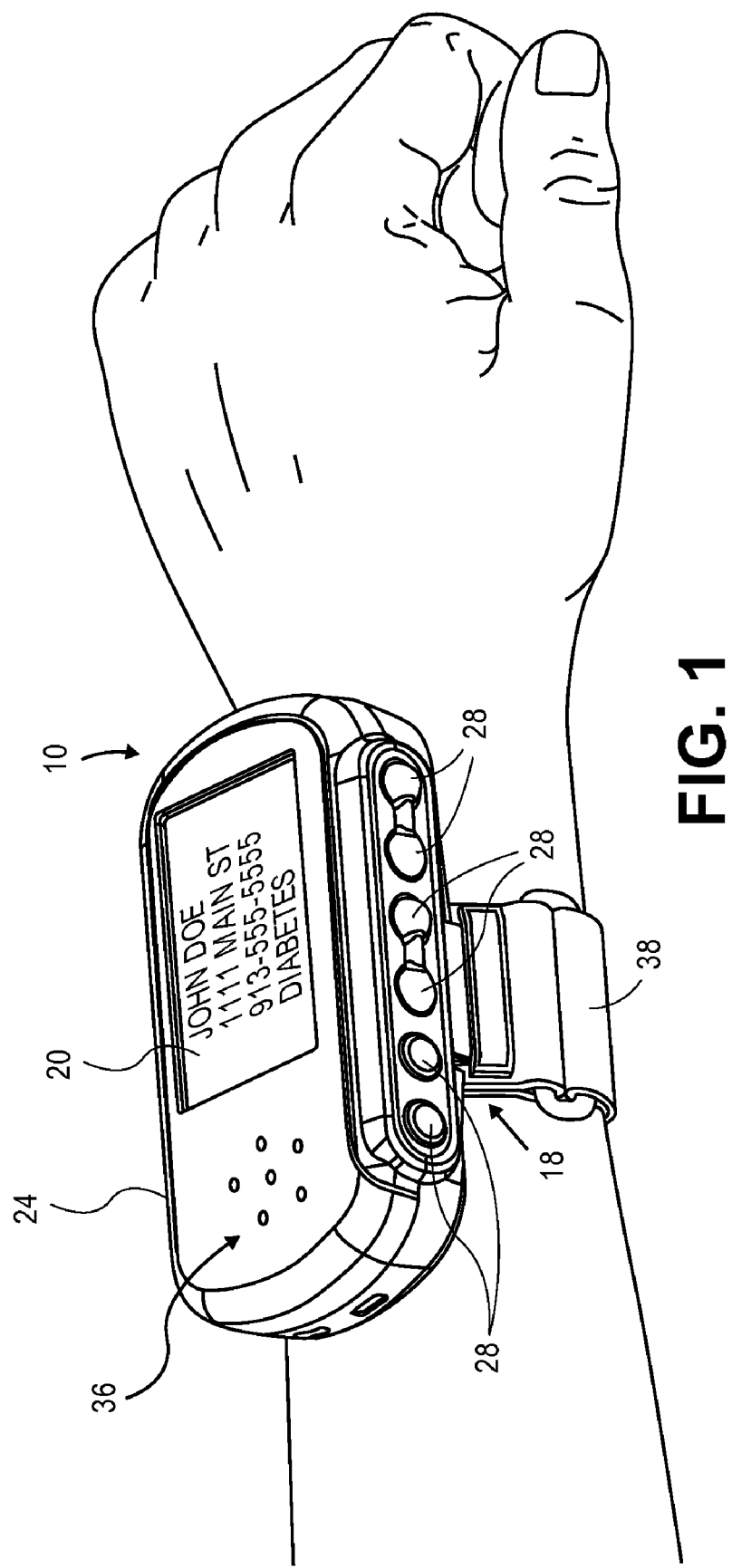
FIG. 1 is a front perspective view of a wearable navigation device configured in accordance with various preferred embodiments of the present invention, the navigation device shown worn on a user's arm.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
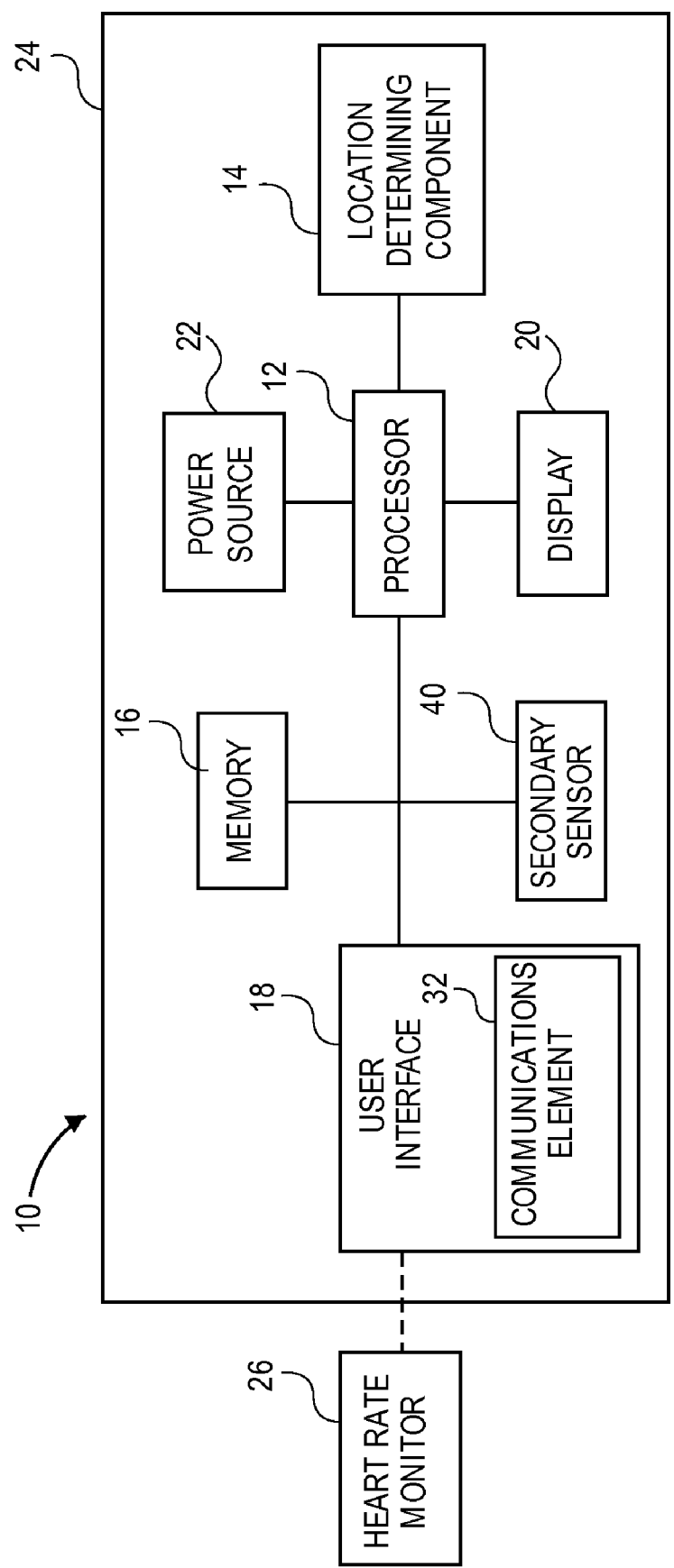
FIG. 2 is a block diagram of certain components of the navigation device of FIG. 1.

As shown in FIGS. 1-2, the present invention is preferably implemented utilizing a navigation device 10. The device 10 may be any electronic device operable to receive, utilize, or otherwise determine geographic information, such as a current geographic location. Thus, the device 10 may include computers, televisions, radios, portable computing devices such as laptops or personal data assistants (PDAs), cellular telephones, portable entertainment devices, etc. More preferably, the device 10 is a wearable navigation device manufactured by GARMIN INTERNATIONAL, INC. of Olathe, Kans. However, the device 10 may be any device configured as described herein or otherwise operable to perform the functions described below.

The device 10 preferably includes a processor 12, a location determining component 14 coupled with the processor 12 to facilitate determination of a current geographic location, a memory 16 coupled with the processor 12 and operable to store information, a user interface 18 coupled with the processor 12 and operable to communicate with a user, a display 20 and power source 22 each coupled with the processor 12, and a housing 24 for housing the various components of the device 10. In various embodiments, the device 10 includes or is operable to couple with a heart rate monitor 26.

The processor 12 is preferably coupled with the user interface 18, location determining component 14, memory 16, and display 20, through wired or wireless connections, such as a data bus, to enable information to be exchanged between the various elements. Further, the processor 12 is preferably operable to control the various functions of the device 10 according to a computer program, including one or more code segments, or other instructions associated with the memory 16 or with various processor logic and structure. The processor 12 may comprise various computing elements, such as integrated circuits, microcontrollers, microprocessors, programmable logic devices, etc, alone or in combination, to perform the operations described herein.

As described below in more detail, the processor 12 may determine a current geographic location of the device 10 by receiving the geographic location from the location determining component 14 or from another device through the user interface 18. Alternatively, the processor 12 may independently determine geographic locations based on information and/or data, such as received navigation signals, provided by the location determining component 14, stored within the memory 16, or acquired from other devices or elements.

The processor 12 is preferably further operable to generate performance monitoring information utilizing geographic location information acquired from the location determining component 14 and/or other sources such as the heart rate monitor 26 or memory 16. For instance, the processor 12 is generally operable to monitor and calculate performance values related to user exercise, and display information related to these performance values on the display 20. The performance values may include, for example, the user's heart rate, speed, total distance traveled, total distance goals, speed goals, pace, cadence, training zones, and calories burned. Supplemental performance information may be provided to the processor 12 from an external source or through the user interface 18. Additional performance monitoring information and features that may be utilized or provided by various embodiments of the present invention are disclosed in U.S. Pat. No. 6,837,827, which is incorporated herein by specific reference.

The location determining component 14 is preferably a Global Positioning System (GPS) receiver, and is adapted to provide, in a substantially conventional manner, geographic location information for the device 10. The location determining component 14 may be, for example, a GPS receiver much like those disclosed in U.S. Pat. No. 6,434,485, which is incorporated herein by specific reference. However, the location determining component 14 may receive cellular or other positioning signals utilizing various methods to facilitate determination of geographic locations without being limited to GPS.

As is known in the art, the GPS is a satellite-based radio navigation system that allows determination of navigation information, such as position, velocity, time, and direction, for an unlimited number of users. Formally known as NAVSTAR, the GPS incorporates a plurality of satellites that orbit the earth.

The location determining component 14 scans for GPS satellite signals and, upon receiving signals from at least three different satellite signals, the location determining component 14 utilizes the three satellite signals to determine its own position. Acquiring a fourth satellite signal will allow the location determining component 14 to calculate its three-dimensional position by the same calculations. As should be appreciated, the processor 12 may be operable to perform one or more of these functions in place of the location determining component 14.

Although GPS enabled devices are often used to describe navigation devices, it will be appreciated that satellites need not be used to determine a geographic position of a receiving unit since any receiving device capable of receiving signals from multiple transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Figure 4:
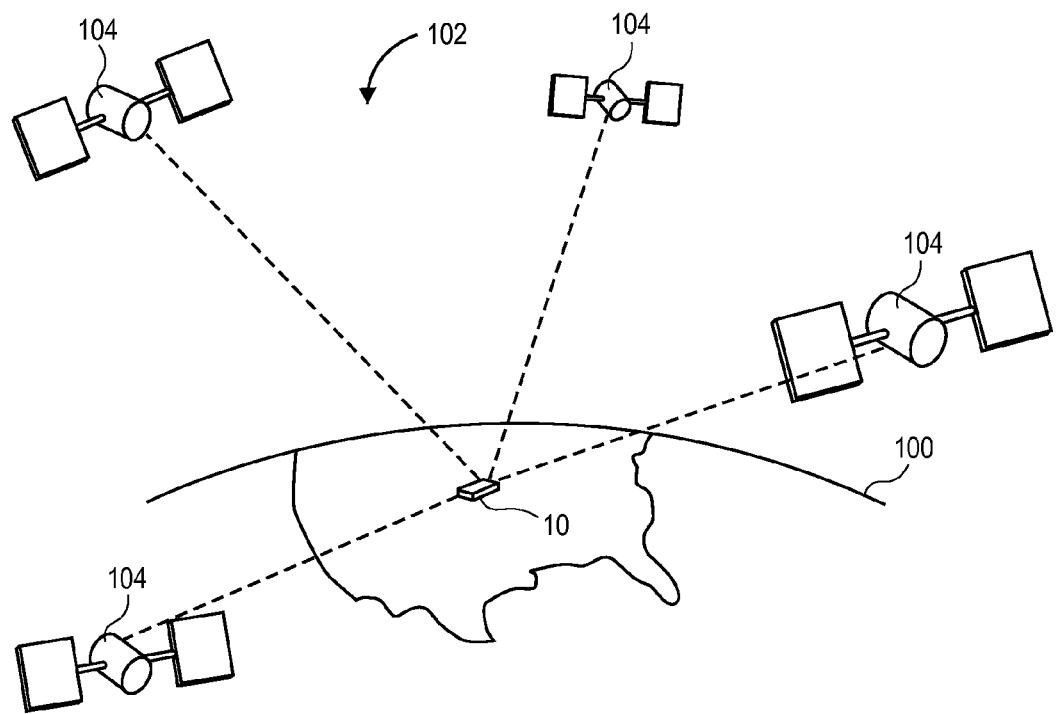
FIG. 4 is schematic diagram of a Global Positioning System (GPS) that may be utilized by various embodiments of the present invention.

FIG. 4 shows one representative view of a GPS denoted generally by reference numeral 102. A plurality of satellites 104 are in orbit about the Earth 100. The orbit of each satellite is not necessarily synchronous with the orbits of other satellites and, in fact, is likely asynchronous. The navigation device 10, including the location determining component 14, is shown receiving spread spectrum GPS satellite signals from the various satellites 104.

The location determining component 14 may also include various processing and memory elements to determine the geographic location of the device 10 itself or it may provide information to the processor 12 to enable the processor 12 to specifically determine the geographic location of the device 10. Thus, the location determining component 14 need not itself calculate the current geographic location of the device 10 based upon received signals.

Further, the location determining component 14 may be integral with the processor 12 and/or memory 16 such that the location determining component 14 may be operable to specifically perform the various functions described herein. Thus, the processor 12 and location determining component 14 need not be separate or otherwise discrete elements.

In various embodiments the location determining component 14 need not directly determine the current geographic location of the device 10. For instance, the location determining component 14 may determine the current geographic location utilizing the user interface 18, such as by receiving location information from the user, through the communications network, from another electronic device, etc.

The location determining component 14 also preferably includes an antenna, which is preferably positioned within the housing 24 opposite the display 20, to assist the location determining component 14 in receiving signals. The antenna is preferably a GPS patch antenna or helical antenna but may be any other type of antenna that can be used with navigational devices. The antenna may be mounted directly on or in the housing 24 or may be mounted external to the housing 24. The antenna is preferably protected from adverse conditions, such as those described above, by being entirely enclosed within the housing 24.

Additionally, any harmful physical contact that can occur from a user's accidental contact with a conventional, pointed, antenna is eliminated as the antenna preferably has no sharp points protruding from the housing 24. Furthermore, the placement of the antenna adjacent to the display 20 provides the antenna with adequate reception, regardless of the user's physical alignment, as the antenna is always orientated away from the user. The antenna may also be operable to broadcast signals and may be positioned elsewhere within the housing 24 or external to the housing 24.

The memory 16 is coupled with the processor 12 and/or other device 10 elements and is operable to store various data utilized by the processor 12 and/or other elements. The memory 16 may include removable and non-removable memory elements such as RAM, ROM, flash, magnetic, optical, USB memory devices, and/or other conventional memory elements.

Further, the memory 16 may comprise a portion of the user interface 18 to enable the user to provide information to the device 10 via the memory 16, such as by inserting a removable memory element into a slot 30 to provide information and instruction to the device 10. The memory 16 may also be integral with the processor 12, such as in embodiments where the memory 16 comprises internal cache memory.

The memory 16 may store various data associated with operation of the device 10, such as a computer program, code segments, or other data for instructing the processor 12 and other device 10 elements to perform the steps described below. Further, the memory 16 may store various cartographic data corresponding to geographic locations including alert information, map data, and map elements, such as thoroughfares, previous geographic locations, terrain, points of interest, geographic entities, performance or exercise information, and other navigation and performance data, to facilitate the various navigation functions provided by the device 10. Additionally, the memory 16 may store destination addresses and previously calculated or otherwise acquired routes to various destination addresses for later retrieval by the processor 12.

Further, the various data stored within the memory 16 may be associated within a database to facilitate processor 12 retrieval of information. For example, the database may be configured to enable the processor 12 to retrieve geographic locations, geographic entities, and alert information based upon a current geographic location of the device 10 or other received information or inputs.

The user interface 18 enables users, third parties, or other devices to share information with the device 10. The user interface 18 enables the user and device 10 to exchange information relating to the device 10, including exercise and performance information, geographic entities, configuration, security information, preferences, route information, points of interests, alerts and alert notification, navigation information, waypoints, a destination address, etc. The user interface 18 is generally associated with the housing 24, such as by physical connection through wires, etc, or wirelessly utilizing conventional wireless protocols. Thus, the user interface 18 need not be physically coupled with the housing 24.

The user interface 18 may comprise one or more functionable inputs 28 such as buttons, switches, scroll wheels, etc, a touch screen associated with the display 20, voice recognition elements such as a microphone, pointing devices such as mice, touchpads, trackballs, styluses, a camera such as a digital or film still or video camera, combinations thereof, etc. Further, the user interface 18 may comprise wired or wireless data transfer elements such as removable memory including the memory 16, data transceivers, etc, to enable the user and other devices or parties to remotely interface with the device 10.

The functionable inputs 28 are preferably positioned on the side of the housing 24 such that the user may easily access them during exercise, as shown in FIG. 1. The inputs 28 may include descriptive markings that identify their function. Preferably, the inputs 28 are positioned such that the user may operate the inputs with one hand, thus enabling the user to continue exercising while operating the device 10 when the device 10 is coupled with the user's arm.

In some embodiments, the user interface 18 may include a communications element 32 to enable the device 10 to communicate with other computing devices 34, navigation devices, and any other network enabled devices through a communication network, such as the Internet, a local area network, a wide area network, an ad hoc or peer to peer network, or a direct connection such as a USB, Firewire, or Bluetooth connection, etc. Similarly, the user interface 18 may be configured to allow direct communication between similarly configured navigation devices, such that the device 10 need not necessarily utilize the communications network to share information.

Figure 6:
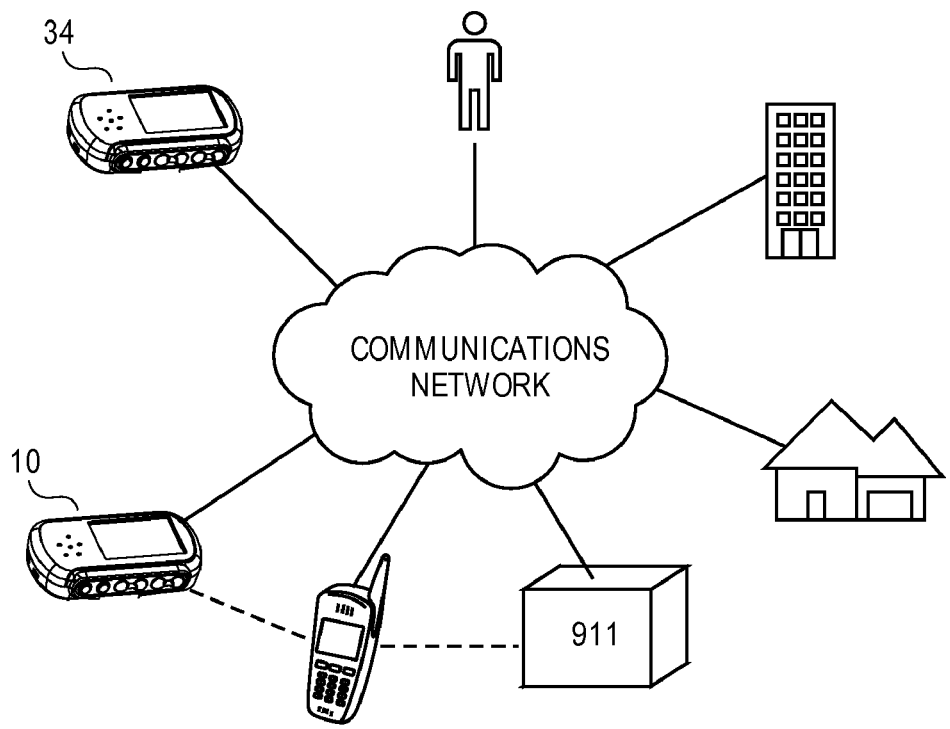
FIG. 6 is a block diagram showing the navigation device of FIGS. 1-2 coupled with a communications network.
Figure 7:
FIG. 7 is a sample screen display of the navigation device of FIGS. 1-2, the sample screen display showing a first exemplary alert message.
Figure 8:
FIG. 8 is a sample screen display of the navigation device of FIGS. 1-2, the sample screen display showing a second exemplary alert message.
Figure 9:
FIG. 9 is a sample screen display of the navigation device of FIGS. 1-2, the sample screen display showing a third exemplary alert message.
Figure 10:
FIG. 10 is a sample screen display of the navigation device of FIGS. 1-2, the sample screen display showing a fourth exemplary alert message.

For instance, as shown in FIG. 6, in some embodiments the communications element 32 is operable to directly communicate with a cellular phone utilizing Bluetooth or other similar methods. In such embodiments, the processor 12 and communications element 32 may send instructions and commands to the cellular phone to, for instance, cause the cellular phone to call a phone number and provide information or alerts upon connection to the called number. As should be appreciated, the communications element 32 may directly communicate with any external devices, such as pagers, portable entertainment devices, computing devices, VoIP phones, etc, and is not limited to communicating with cellular phones.

In various embodiments the communications element 32 may enable the device 10 to wirelessly communicate with the communications network utilizing wireless data transfer methods such as WiFi (802.11), Wi-Max, Bluetooth, ultra-wideband, infrared, cellular telephony, radio frequency, etc. However, the communications element 32 may couple with the communications network utilizing wired connections, such as an Ethernet cable, and is not limited to wireless methods.

The communications element 32 may also be operable to access emergency service radio frequencies and channels. For instance, the communications element 32 may be operable to communicate on police, fire, and EMS frequencies. Further, the communications element 32 may be operable to communicate on family radio service (FRS) and general mobile radio service (GMRS) frequencies. In embodiments where the communications element 32 is operable to communicate on a plurality of frequencies or channels, the communications element 32 may scan and transmit on each channel simultaneously or sequentially.

The user interface 18 is preferably operable to provide various information to the user utilizing the display 20 or other visual or audio elements such as a speaker 36. The speaker 36 may be a generally conventional speaker operable to generate audible sounds in the 10 Hz-20 kHz range. However, in some embodiments the speaker 36 is able to generate sounds beyond human hearing, such as sounds having frequencies that may be easily heard by dogs but not humans.

The display 20 is coupled with the processor 12 and/or other device 10 elements and is operable to display various information corresponding to the device 10, such as alerts and alert messages, maps, locations, and other navigation information. The display 20 may comprise conventional black and white, monochrome, or color display elements including CRT, TFT, and LCD devices. Preferably, the display 20 is of sufficient size to enable the user to easily view the display 20 to receive presented information while exercising.

Further, as described above, the display 20 may comprise a portion of the user interface 18, such as in embodiments where the display 20 is a touch-screen display to enable the user to interact with the display 20 by touching or pointing at display areas to provide information to the device 10.

The power source 22 is associated with the housing 24 to provide electrical power to various device 10 elements. For example, the power source 22 is preferably directly or indirectly coupled with the user interface 18, location determining component 14, processor 12, memory 16, and/or display 20. The power source 22 may comprise conventional power supply elements, such as batteries, battery packs, etc. The power source 22 may also comprise power conduits, connectors, and receptacles operable to receive batteries, battery connectors, or power cables. For example, the power source 22 may include both a battery to enable portable operation and a power input for receiving power from an external source such an automobile or wall outlet.

The housing 24 is preferably constructed from a suitable lightweight and impact-resistant material such as, for example, plastic, nylon, aluminum, or any combination thereof. The housing 24 preferably includes one or more appropriate gaskets or seals to make it substantially waterproof or resistant. The housing 24 may include a location for the power source 22. Though shown as being substantially elongated, the housing 24 may take any suitable shape or size, including, for example, ergonomic shapes molded to substantially correspond to a portion of the user's forearm or wrist whereupon or against which the housing 24 preferably rests as discussed below. The particular size, weight and configuration of the housing 24 may be changed without departing from the scope of the present invention.

The housing 24 is preferably configured to be worn by the user. Most preferably, the housing 24 is operable for coupling with the user's arm, such as the user's wrist, forearm, or upper arm, utilizing a strap 38. The strap 38 is preferably made of lightweight and resilient fabric, such that the strap 38 may encircle the user's arm without discomfort while still adequately securing the housing 24 to the user's forearm or wrist. The strap 38 is removably secured to the housing 24 by the attachment of securing elements to corresponding connecting elements.

The securing elements and the connecting elements may be any conventional reciprocal connecting and securing pair, such as hooks, latches, clamps, snaps, buttons, etc. The strap 38 is attached to the user's forearm or wrist by encircling the strap around the user's forearm and securing the strap to itself through the use of hooks, latches, clamps, or other conventional fastening elements, thereby securing the housing 24 to the user's forearm. Alternatively, the strap 38 may be configured to attach to other parts of the user, such as the user's leg, waist, chest, or upper arm.

As should be appreciated, the housing 24 may take any form operable to house various portions of the device 10. For instance, instead of the elongated form discussed above and shown in FIG. 1, the housing 24 may include a watch-like configuration that couples with the user's wrist, etc. In preferred embodiments the housing 24 is configured for coupling directly to the user such that the device 10 may be easily worn and transported during exercise, such as running, without interfering with the user. Such wearable configurations are additionally preferable because they are operable to most effectively alert others to the location of the user because they are worn by the user.

Figure 11:
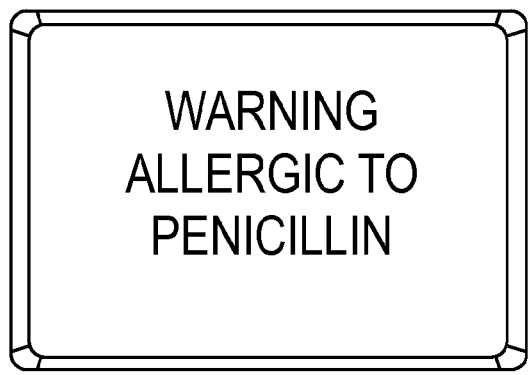
FIG. 11 is a sample screen display of the navigation device of FIGS. 1-2, the sample screen display showing a fifth exemplary alert message.
Figure 12:
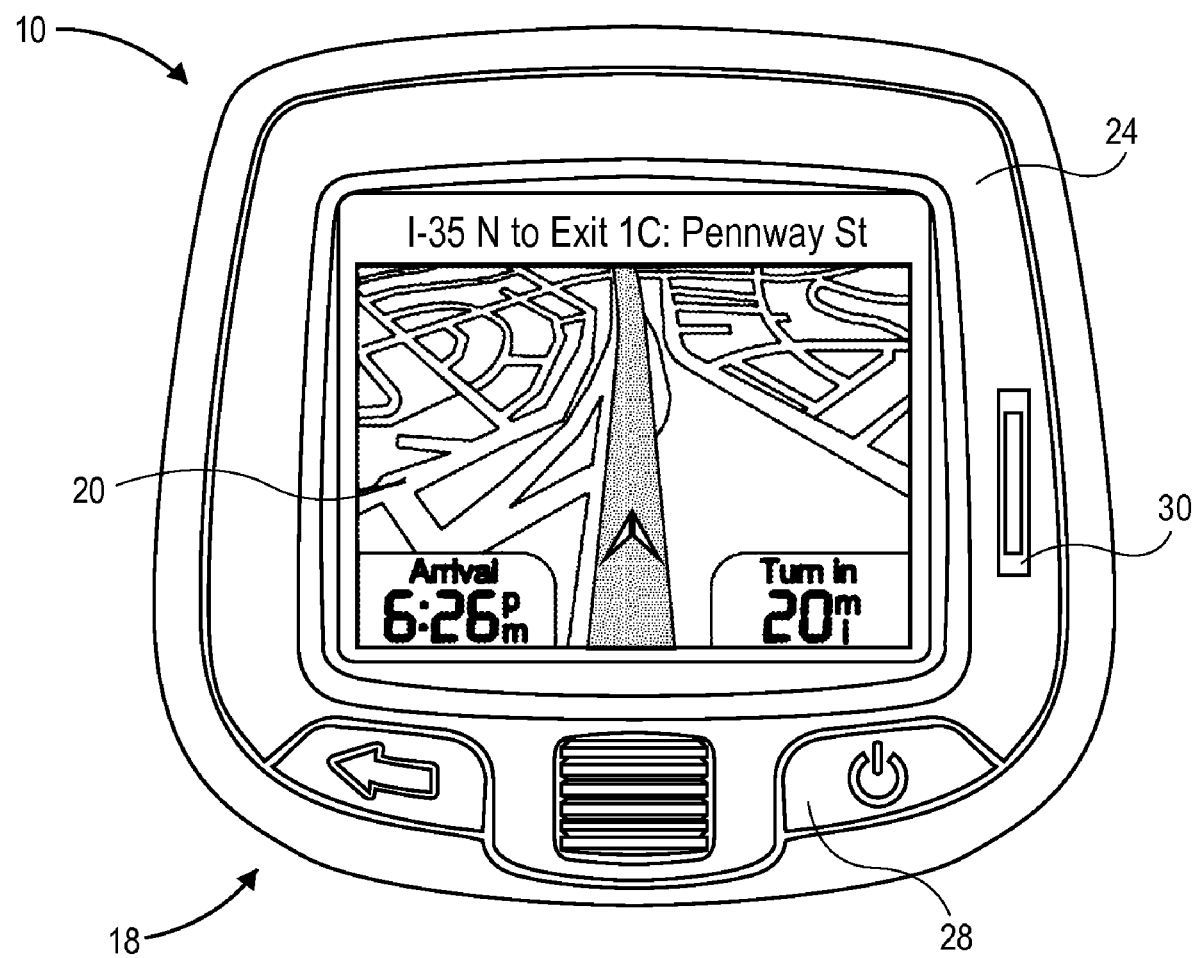
FIG. 12 is a front view of a navigation device configured in accordance with various other embodiments of the present invention.

However, in some embodiments the housing 24 need not be operable for easy coupling with the user and may be instead configured for mounting within or to an automobile, bicycle, etc. Thus, in some embodiments the device 10 is not a wearable electronic device. For instance, the housing 24 may present the configuration shown in FIG. 11 and in U.S. Pat. No. D510,285, incorporated herein by specific reference, for mounting to an automobile windshield instead of to a portion of the user's body. However, as the device 10 is preferably utilized to provide an alert when the user becomes incapacitated during exercise, it is preferable that the housing 24 is operable for wearing as discussed in the preceding paragraph.

The heart rate monitor 26 preferably includes a pair of heart rate sensors carried on a strap operable to be worn below the user's breastplate. The sensors are connected to a transmitter that wirelessly transmits heart rate data to the processor 12 and/or memory 16. Preferably, when the user puts on the heart rate monitor, it begins transmitting heart rate data plus a unique, randomly selected code. When the device 10 is turned on, it begins "listening" for data from the heart rate monitor. Once the device 10 "hears" two or more transmissions of heart rate data that contain the same unique code, it pairs with the heart rate monitor, creating a unique wireless link.

Once paired, the device 10 does not receive conflicting signals from another heart rate monitor due to utilization of the randomly selected code, so the user can exercise in close proximity to other heart rate monitors without fear of interference. If the device 10 loses a heart rate signal, the pairing process begins again automatically. However, as should be appreciated, the heart rate monitor 26 may include any element operable to acquire a user heart rate and provide the acquired user heart rate to the device 10 and/or processor 12.

In various embodiments, the device 10 may additionally include a secondary movement sensor 40 that is operable to detect movement of the device 10 independent of the location determining component 14. The secondary movement sensor 40 is coupled with the processor 12 and may include elements such an accelerometer, a gyroscope, a tilt sensor, a compass, combinations thereof, etc. However, the secondary movement sensor 40 may comprise any element or combinations of elements that are operable to sense a condition corresponding to movement, such as position, velocity, acceleration, changes thereof, etc, and provide a signal corresponding to the sensed condition to the processor 12 and/or memory 16.

Figure 3:
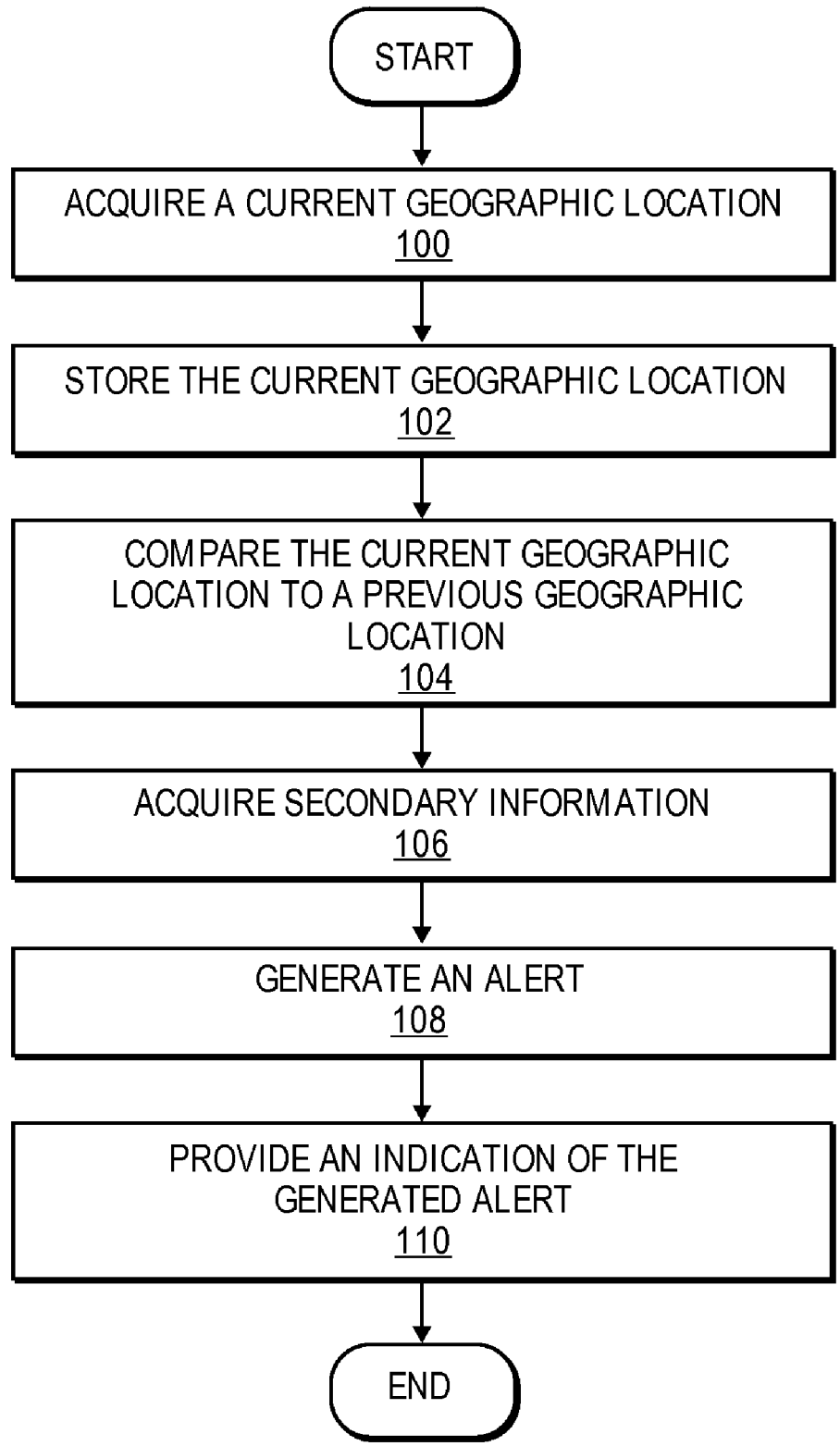
FIG. 3 is a flow chart showing some of the steps that may be performed by various embodiments of the present invention.

Steps 100-108 shown in FIG. 3 generally illustrate a method operable to be performed by various embodiments of the present invention. Steps 100-108 generally include:

acquiring a current geographic location, referenced at step 100; storing the current geographic location, referenced at step 102; comparing geographic locations, referenced at step 104; acquiring secondary information, referenced at step 106; generating an alert, referenced at step 108; and providing an indication of the generated alert, referenced at step 110.

Steps 100-110 may be performed in any order and are not limited to the specific order described herein. Further, steps 100-110 may be performed simultaneously or concurrently such that the steps are not necessarily sequential. Further, steps 100-110 are not each necessarily performed by all embodiments of the present invention and are not necessarily performed in the order listed herein.

In step 100, the current geographic location is determined. Preferably, the determined current geographic location corresponds to the current geographic location of the device 10. However, in some embodiments the current geographic location may correspond to a user location independent of the device 10 location.

The current geographic location of the device 10 is preferably determined as described above utilizing the location determining component 14. Thus, for instance, the current geographic location may be determined in step 100 by receiving GPS signals and computing the current geographic location from the received GPS signals. However, as is also described above, the current geographic location may be determined utilizing other methods, such as by retrieving the current geographic location from the memory 16, the user interface 18, and/or the communications network.

Step 100 is preferably repeated continuously or at regular intervals to ensure that the device 10 is provided with an accurate current geographic location as the device 10 moves and the user exercises.

In step 102, the current geographic location acquired in step 100 is stored. Preferably, the current geographic location is stored within the memory 16 for utilization by the processor 12. Preferably, step 102 is preformed in combination with step 100 such that each time a current geographic location is acquired it is stored within the memory 16. Thus, steps 100 and 102 are preferably repeatedly performed in combination. However, step 102 may be performed at intervals less than step 100, such as where only every fifth acquired current geographic location is stored within the memory 16.

In some embodiments, the current geographic location may be stored within the memory 16 in an ordered listing, array, or database to allow stored geographic locations to be accessed according to the time at which they were acquired. For instance, if step 100 has been performed twenty times, the corresponding twenty geographic locations may be stored within the memory 16 in such a manner that they may be easily retrieved for comparison in step 104.

Further, the current geographic location acquired in step 100 may be stored in the memory 16 such that it replaces a previously acquired and stored geographic location. For instance, the memory 16 may include a database of only the most recent fifty acquired geographic locations and each new current geographic location acquired by repetition of step 100 may replace one of the stored geographic locations. Such a configuration reduces required memory capacity while enabling the memory 16 to include an accurate history of the geographic locations acquired through repetition of step 100.

In step 104, geographic locations are compared. Preferably, the processor 12 compares the current geographic location acquired in step 100 to a previously acquired geographic location that is stored within the memory 16. As explained in more detail below, the comparison of step 104 is utilized to identify the extent to which the device 10 has moved and to determine if an alert should be generated. Thus, the comparison provided by step 104 preferably compares the current geographic location to a stored geographic location that was recently acquired, such as a stored geographic location that corresponds to a current geographic location acquired one minutes, two minutes, or at any other previous time that may be utilized to indicate a user problem due to limited movement.

Further, in various embodiments the processor 12 may compare the current geographic location of the device 10 acquired in step 100 to a plurality of previously acquired geographic locations. Such a comparison enables the movement range of the device 10 to be determined over an interval, such as one minute, two minutes, five minutes, or over any other interval that may be utilized to indicate a user problem due to non-movement, instead of comparing two discrete locations as discussed in the preceding paragraph.

For example, the processor 12 may compare the current geographic location of the device 10 acquired in step 100 with a plurality of stored geographic locations corresponding to current geographic locations acquired within the last one minute, two minutes, etc, to determine the extent to which the device 10 has moved. The intervals and other time indications utilized by the processor 12 for geographic location comparison may be predefined static values, be dynamically defined by the device 10 based on acquired and stored data, and/or be defined by the user through the user interface 18.

Preferably, the processor 12 compares the current geographic location to one or more stored geographic locations to determine if the device 10 is currently within a predetermined range from the previous geographic locations. By comparing the geographic locations utilizing a predetermined range the device 10 is operable to provide an indication of movement even if there are GPS or other measurement errors. For instance, if the predetermined range is ten feet, the geographic location comparison will not be affected by typical GPS errors. Further, if the device 10, and its accompanying user, have only moved ten feet in the last minute, two minutes, etc., the comparison still provides an indication of a user problem such as injury or incapacitation.

The predetermined range may be any value, but is preferably in the range of one foot to twenty-five feet. Further, the predetermined range may be provided by the user through the user interface 18 or be dynamically variable based on the particular configuration of the device 10. For instance, if the user is exercising by walking, the user may function the user interface 18 to enter an exercise-walking mode that includes a predetermined range that is less (or greater) than the predetermined range utilized if the user had functioned the user interface 18 to enter an exercise-running mode.

Further, the device 10 may automatically vary the predetermined range by measuring the speed or pace of the user such that the greater the average or typical speed of the user the greater (or lesser) the predetermined range. The predetermined range may also vary based upon how often the device 10 performs the geographic location comparison. For instance, if the device 10 performs the comparison every few seconds, the predetermined range will be less than if the device 10 performs the comparison every few minutes as the user will move a greater distance, if uninjured, in a greater time period. The device 10 may also vary the predetermined range based on the quality or strength of the GPS signals received by the location determining component 14. For example, the device 10 may shorten the predetermined range when the GPS signal quality is good and increase the predetermined range when the GPS signal quality is poor.

Preferably, step 104 is performed continuously or at regular intervals to facilitate accurate generation of the alert in step 108. For instance, each time step 100 and 102 are performed step 104 may be performed as well to accurately compare the current geographic location of the device 10 to previously stored geographic locations. To provide a meaningful comparison that may be utilized to indicate a potential user problem in step 108, the comparison is more preferably performed at an interval greater than thirty seconds to prevent the generation of a false alert should the user temporarily stop exercising. However, step 104 may be performed at any interval and is not necessarily performed each time steps 100 and 102 are performed.

Alternatively, the comparison can be performed substantially continually, or each time a new geographic location is determined. In this case, the alert may be generated only when the locations for the preceding period of time, the interval, have shown little or no movement, thereby indicating a user problem.

In step 106, secondary information is acquired. Preferably, the processor 12 acquires the secondary information to assist in the alert generation performed in step 108. The secondary information may include a user input, a heart rate acquired from the heart rate monitor 26, information or data acquired from the secondary movement sensor 40, combinations thereof, etc. Thus, the secondary information acquired in step 106 may be any information other than the current geographic location acquired in step 100.

In various embodiments, the second information may include a mode input provided to the user interface 18 by the user. For instance, the device 10 may be operable to function in various operational modes, such as a navigation mode, an entertainment mode, and an exercise mode. While in the exercise mode, the device 10 provides the various performance monitoring functions discussed above, such as a timer, an exercise rate, etc. Thus, for instance, the user may function one of the functionable inputs 28 to provide a mode input corresponding to the exercise mode to instruct the device 10 that the user intends to exercise. Further, the exercise mode may include sub-modes, such as a walking mode, a running mode, a biking mode, a swimming mode, etc.

In contrast, other mode inputs, such as those corresponding to navigation and entertainment modes, may not be directly related to exercise or performance monitoring. As discussed below in more detail in step 108, the mode input allows the device 10 to generate an alert only if the mode input corresponds to the exercise mode such that false alerts are not generated when the user is not exercising or otherwise at risk.

In various embodiments, the secondary information may include a status input provided to the user interface 18 by the user. As is discussed in more detail below, when the comparison performed in step 104 indicates that an alert should be issued in step 108, the processor 12 may first prompt the user for the status input utilizing the display 20 before generating the alert. Prompting for the status input before generating the alert ensures that false alerts are not generated when the user is resting, when the user has finished exercising, or when the user is otherwise intentionally stationary.

For example, the processor 12 may instruct the display 20 to present a visual indication of a status input prompt, such as a flashing or other noticeable request for input. If the user functions the user interface 18, such as by depressing one of the functionable inputs 28 or issuing a voice command, the status input is provided to the processor 12 for use in step 108. The processor 12 may also prompt the user for the status input using an audible prompt, such as a beep or voice request, generated by the speaker 36.

The secondary information may also correspond to other user inputs or combinations of user inputs. For example, the secondary information acquired in step 106 may correspond to device configuration, user preferences, time limits, etc. Thus, for instance, the user may function the user interface 18 to disable the alert generation of step 108 and/or function the user interface 18 such that alerts are generated only during a defined time period, such as during the user's typical morning exercise.

In various embodiments, the secondary information acquired in step 106 includes a heart rate acquired from the heart rate monitor 26. As discussed above, the device 10 may include or be coupled with the heart rate monitor 26 to acquire a heart rate therefrom. The heart rate is preferably acquired continuously or at regular intervals to facilitate an accurate alert generation. Further, the acquired heart rate or heart rates may be stored within the memory 16 for use and analysis by the processor 12. The secondary information may also include contact data that indicates if the user is wearing the heart rate monitor 26.

The secondary information may include other biometric information provided by other sensors internal or external to the device 10. For instance, the device 10 may be coupled with or include sensors to measure the user's body temperature, hydration or sweat levels, etc., such that the acquired biometric information may be utilized as the secondary information by the device 10.

The secondary information may also correspond to data and information received by the processor 12 from the secondary movement sensor 40. As discussed above, the secondary movement sensor 40 is operable to detect user movement independent of the location determining component 14. For instance, the secondary movement sensor 40 may be able to detect rapid acceleration or deceleration of the user, such as if a car strikes the user, utilizing accelerometers, gyroscopes, etc. The secondary movement sensor 40 may continuously or repetitiously provide information to the processor 12 for use as the secondary information and/or the secondary movement sensor 40 may provide information to the processor 12 only when a change in movement is detected.

Step 106 is not necessarily performed in all embodiments as the alert may be generated in step 108 without utilizing secondary information. Further, any combination of secondary information may be acquired in step 106 and the acquired secondary information is not limited to any one of the examples discussed above.

In step 108, an alert is generated. Preferably, the processor 12 generates the alert utilizing the comparison performed in step 104 and/or the secondary information acquired in step 106. The processor 12 generates the alert by forming data and/or generating a signal corresponding to the alert. For instance, the processor 12 may generate the alert by storing data corresponding to the alert in the memory 16 and/or by generating a signal or signals, such as a plurality of control signals, to instruct various device 10 elements as discussed below in step 110. Thus, the alert generated by the processor 12 in step 108 is not necessarily provided to the user as the alert may be generated by manipulating data or providing various internal electrical signals.

As discussed above, the processor 12 may generate the alert based on the comparison provided in step 104. If the device 10 has not moved over a predetermined or selected time period, the processor 12 may generate the alert. For instance, if the device 10 is stationary for any period of time the processor 12 may generate the alert. Similarly, if the device 10 has not moved beyond the predetermined range, as is discussed above in detail, over any period of time the processor 12 may generate the alert. Preferably, the processor 12 generates the alert only if the device 10 is stationary or within the predetermined range for a period of time greater than thirty seconds to reduce the probability of false alerts when the user intentionally remains stationary.

The processor 12 may also generate the alert based upon the geographic location comparison when the user is moving too fast or too slow according to the acquired and previous geographic locations. For instance, if the user is running faster or longer than a predefined value, such as a user provided limit or a device 10 calculated limit, the processor 12 may generate a specific alert to instruct the user to slow down or speed up.

As should be appreciated, the processor 12 may generate specific alerts corresponding to innumerable conditions by utilizing the secondary information or other information stored within the memory 16. For instance, the acquired heart rate may be utilized to generate a specific alert telling the user to slow down or speed up and/or other biometric information, such as user temperature, may be utilized to generate a specific alert instructing the user to stop exercising and drink water.

The generated alert may include a basic alert and/or an alert message. The alert message may include information such as user contact information, such as the user's name, phone number, and address, user medical information, first responder instructions, suggested user actions, combinations thereof, etc. Exemplary alert messages are shown in the screen displays provided by FIGS. 7-11 and in FIG. 1. Additionally, the alert message may be displayed when the device 10 is initially powered on to enable first responders to easily obtain information regarding the user.

The alert message is preferably user defined. For instance, the user may function the user interface 18 to input information corresponding to the alert messages for storage in the memory 16. Thus, the alert message may include free form text information, information corresponding to predefined fields, user generated speech, etc. However, in some embodiments the alert message may be generated without any prior user input, such as where the alert message corresponds to general instructions.

Preferably, the processor 12 generates the alert utilizing both the geographic location comparison and the acquired secondary information. Although generating the alert utilizing the comparison by itself may be beneficial in some embodiments, such a configuration is likely to generate unnecessary false alerts, such as where the user is not yet exercising or has finished exercising. Thus, utilization of the combination of the geographic location comparison and the acquired secondary information reduces false alerts by enabling the alert to be generated based on more than one factor.

For instance, as discussed above, the secondary information may include a mode input provided by a user. In embodiments utilizing the mode input, the processor 12 preferably provides the alert based upon the geographic location comparison only when the mode input corresponds to exercise mode. Such a configuration eliminates false alerts that may be generated while the user is not exercising, such as where the user is transporting the device 10 for use or utilizing the device 10 for navigation purposes.

Further, in some embodiments the secondary information includes a status input as discussed above. The status input prevents the generation of false alerts by prompting the user for an input before generating the alert. Preferably, the processor 12 utilizes the comparison of step 104 to determine if the alert should be generated, as is discussed above, and if the comparison indicates that the alert should be generated, the processor 12 generates a prompt for the status input. The display 20 and/or speaker 36 may provide a visual indication of the prompt, such as a flashing or bold message in combination with standard display elements, a voice instruction, an audible beep, etc. If the user does not function the user interface 18 within a predetermined time after prompting, such as thirty seconds, one minute, etc, the processor 12 then generates the alert. The predetermined time may be provided by the user through the user interface 18, the predetermined time may be a constant value stored within the memory 16, and/or the predetermined timed may be dynamically varied by the device 10 based on the user's average speed, heart rate, etc.

As is also discussed above, the secondary information may include a heart rate acquired from the heart rate monitor 26. The processor 12 may utilize both the geographic location comparison and the acquired heart rate to determine if the alert should be generated. For instance, if the geographic location comparison indicates that the device 10 is generally stationary and the acquired heart rate is significantly below or above normal levels, the processor 12 may generate the alert. Such a configuration reduces the probability of false alerts by generating an alert only when the acquired heart rate and geographic location indicate that a user problem may exist.

Similarly, the processor 12 may compare the acquired heart rate to previously acquired heart rates to further increase the accuracy of alert generation, such as by comparing the average heart rate over the previous thirty seconds to the average heart rate over the previous five minutes, by comparing recently acquired heart rates to a training zone determined by the processor 12, and/or by detecting if the acquired heart rate is irregular or abnormal.

Preferably, the secondary information corresponding to the acquired heart rate additionally includes contact data that indicates if the user is wearing the heart rate monitor 26. As should be appreciated, if the user is not wearing the heart rate monitor 26, the device 10 should not utilize heart rates acquired therefrom as the acquired heart rates do not correspond to the user. Thus, the processor 12 preferably utilizes the acquired heart rate only when the contact data indicates that the user is wearing the heart rate monitor 26.

The processor 12 may also generate the alert utilizing both the geographic location comparison and data or information acquired from the secondary movement sensor 40. For instance, the processor 12 may generate the alert if the geographic location comparison indicates that the device 10 is generally stationary and the data acquired from the secondary movement sensor 40 indicates a significant deceleration or acceleration, such as if the user fell down or was struck by a car. Further, the processor 12 may also generate an alert if both the geographic location comparison and data acquired from the secondary movement sensor 40 indicate that the device 10 is generally stationary. Such a configuration reduces the probability of a false alert when the location determining component 14 provides an inaccurate geographic location.

As should be appreciated, the processor 12 may utilize any combination of information to generate the alert. For instance, the processor 12 may utilize secondary information corresponding to the mode input, the status input, and the acquired heart rate in combination with the geographic location comparison to generate the alert. However, in some embodiments, the processor 12 need not utilize the geographic location comparison to generate the alert. For instance, the processor 12 may generate the alert utilizing only the acquired heart rate or other secondary information. However, utilization of the geographic location comparison is desirable as it provides an efficient and effective method of determining device 10 and user movement.

Preferably, step 108 is preformed in combination with steps 100-106 such that the alert may be repeatedly generated based upon recently acquired information. However, in some embodiments, the alert may only be generated at regular intervals, such as every minute, to conserve device 10 and processor 12 resources.

Upon generating the alert, the processor 12 may turn off or otherwise temporarily disable the location determining component 14 and/or other components of the device 10, in order to conserve power. This would allow the device 10 to generate the alert for a longer period of time, and thereby increase the chances of alerting someone to the user problem. Alternatively, rather than completely disabling the location determining component 14, or other device 10 components, the processor 12 may direct the location determining component 14 to only periodically determine the current geographic location, or take other action to conserve power.

The processor 12 may generate the alert until the user functions the user interface 18 or otherwise disables the alert. However, in some embodiments the processor 12 may automatically cease generating the alert, such as where the geographic location comparison indicates that the device 10 has begun to move again. For instance, the processor 12 may generate the alert when the geographic location comparison indicates that the device 10 is generally stationary and stop generating the alert when another geographic location comparison indicates the device 10 is no longer stationary. Such a configuration reduces false and annoying alerts by allowing the user to automatically disable the alert by starting to exercise again.

Figure 5:
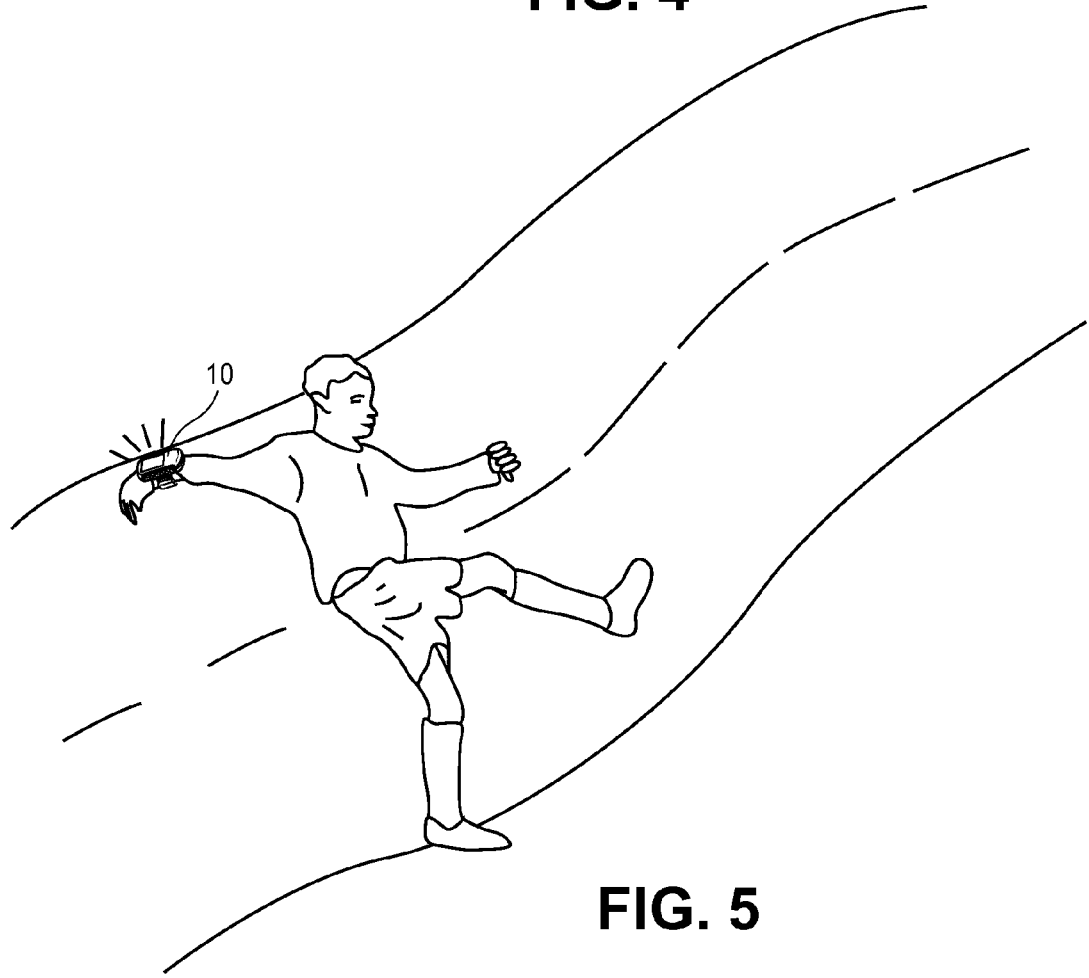
FIG. 5 is a perspective view of the navigation device of FIGS. 1-2, the navigation device shown attached to an injured user and providing an alert.

In step 110, an indication of the alert generated in step 108 is provided. Preferably, the display 20 presents an indication of the generated alert to visually alert the user and nearby individuals. For instance, in some embodiments, the display 20 may flash on and off and/or light and dark to attract attention to the device 10, as is shown in FIG. 5. Further, in some embodiments, the display 20 may present an indication of the alert message discussed above, as is shown in FIGS. 1 and 7-11. Thus, for example, the display 20 may present a flashing alert message upon generation of the alert by the processor 12 in step 108.

The speaker 36 may also be utilized to provide an audible indication of the generated alert. For instance, the speaker 36 may emit an audible alert or beep to attract attention to the device 10. Further, in some embodiments the speaker 36 may emit audible voice messages corresponding to the alert message, such as computer generated or user provided speech corresponding to the alert messages. As be appreciated, both the display 20 and the speaker 36 may be used in combination to provide visual and audible alerts for attracting attention to the device 10 and the user.

The communications element 32 may also be utilized to provide an indication of the generated alert to external sources. As discussed above, the communications element 32 is operable to communicate with external sources through a communications network, such as a cellular network, a LAN, the internet, etc, and/or directly such as through WiFi (802.11) or Bluetooth. Thus, the communications element 32 may send information or data corresponding to the alert through the communications network to notify external sources, such as telephones or computing devices coupled with the communications network, of the alert.

For instance, the communications element 32 may send an email, text message, VoIP call, or other indicator through the communications network to emergency services, such as a 911 operator. Similarly, in some embodiments the communications element 32 may send an alert to a database coupled with the communications network and the database provider may then notify 911 or other first responders of the location of the device 10.

Additionally, the communications element 32 may transmit an indication of the alert utilizing radio transmissions on one or more frequencies or channels. For instance, the communications element 32 may transmit an indication of the alert on police, fire, EMS, FRS, GMRS, and on other frequencies and channels simultaneously or sequentially.

The indication of the generated alert provided to external sources may include a general alert indication, one or more of the alert messages, user or subscriber information, the current geographic location of the device 10 acquired in step 100, data stored within the memory 16 such as previous geographic locations of the device 10, acquired heart rates and other secondary information, combinations thereof, etc.

Further, the communications element 32 may directly communicate with external sources or devices to notify others of the alert. For instance, the communications element 32 may directly communicate with a cellular phone to instruct the cellular phone to call a predetermined phone number to provide an indication of the alert.

Specifically, the communications element 32 may communicate with the cellular phone, or other devices including portable computing devices and VoIP phones, via Bluetooth or other wireless protocols to provide a phone number, such as 911, and instruct the cellular phone to dial the provided number, as shown in FIG. 6. Upon connection to the dialed number the communications element 32 is operable to relay information corresponding to the alert and alert information, such as the alert message, user or subscriber identification information, and the current geographic location of the device 10, to devices or individuals associated with the dialed phone number. For example, the device 10 may transmit a computer-generated or user-provided voice recording to the cellular phone in a similar-manner to a hands-free headset.

Additionally, in some embodiments the communications element 32 may communicate with a cellular phone to cause the cellular phone to generate an audible or visual alert indication. For instance, to conserve the power source 22 supply, the communication element 32 may instruct the cellular phone, should the device 10 detect its existence, to ring and/or flash instead of utilizing the display 20 and/or speaker 36.

The device 10 may provide the indication of the generated alert utilizing any combination of the elements and methods discussed above. For instance, the device 10 may simultaneously generate both visual and audible alerts to attract attention to the device 10 and the user. In some embodiments, the various alert indications may be staggered. For instance, the device 10 may first provide a visual warning, and then after an interval such as thirty seconds, generated an audible warning. After another interval, such as every fifteen seconds thereafter, the volume, pitch, tone, and frequency of the audible warning may increase. Finally, after another interval such as five or ten minutes, the communications element 32 may automatically contact other devices or individuals with an indication of the alert. Such escalating alert indications facilitate location of the device 10 and user without improperly notifying 911 or other third parties when the user takes a short break from exercise.

Further, while providing an indication of the alert as discussed above, the device 10 may disable various features and elements, such as the location determining component 14 or other non-alert related elements to conserve power source 22 supply. By disabling the location determining component 14 and/or other device 10 elements, the supply of the power source 22 is prolonged to enable the alert indication to continue for extended periods of time until help arrives for the user. Further, as power source 22 levels deteriorate, the device 10 may vary the alert indications, such as by decreasing the volume of the audible alert, the visible intensity of the display 20, the frequency of transmissions by the communications element 32, etc.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A wearable navigation device comprising:
    a location determining component operable to determine a current geographic location of the device;
    a memory operable to store data corresponding to a previous geographic location of the device;
    a processor coupled with the location determining component and the memory, the processor operable to compare the current geographic location of the device to the previous geographic location of the device and generate an alert when the comparison indicates that the device has not moved beyond a range during an interval; and
    a display coupled with the processor, the display operable to provide a visual indication of the generated alert.

2. The device of claim 1, further including a housing to house at least portions of the location determining component, the memory, the processor, and the display, the housing operable to be affixed to a user's arm.

3. The device of claim 1, wherein the processor compares the current geographic location of the device to the previous geographic location of the device and generates the alert when the current geographic location of the device is within a predetermined range from the previous geographic location of the device.

4. The device of claim 1, wherein the processor is operable to couple with a heart rate monitor to acquire a user heart rate and generate the alert utilizing both the geographic location comparison and the acquired heart rate.

5. The device of claim 1, wherein the provided visual indication of the alert includes a message selected from the group consisting of user contact information, user medical information, first responder instructions, suggested user actions, and combinations thereof.

6. The device of claim 1, wherein the provided visual indication of the alert is flashed on the display.

7. The device of claim 1, further including a speaker coupled with the processor, the speaker operable to provide an audible indication of the generated alert.

8. The device of claim 1, further including a user interface coupled with the processor and operable to receive a mode input from a user, wherein the processor generates the alert by comparing the geographic locations only when the mode input corresponds to an exercise mode.

9. The device of claim 1, further including a user interface coupled with the processor and operable to receive a status input from a user, wherein the processor generates the alert only if the status input is not received within a predetermined time after a prompting by the display.

10. The device of claim 1, further including a communications element coupled with the processor and operable to communicate with an external source, the communications element operable to provide an indication of the alert to the external source.

11. The device of claim 10, wherein the communications element is operable to communicate with a communications network and provide an indication of the alert to a device coupled with the network.

12. The device of claim 10, wherein the communications element is operable to directly communicate with a cellular phone to instruct the cellular phone to call a predetermined phone number to provide an indication of the alert.

13. A wearable navigation device comprising:
    a location determining component operable to determine a current geographic location of the device;
    a memory operable to store data corresponding to a previous geographic location of the device;
    a user interface operable to receive a status input from a user;
    a processor coupled with the location determining component, the memory, and the user interface, the processor operable to—
        compare the current geographic location of the device to the previous geographic location of the device to determine if the current geographic location is within a predetermined range from the previous geographic location,
        if the current geographic location is within the predetermined range from the previous geographic location, generate a prompt for the status input, and
        if the status input is not received within a predetermined time after prompting, generate an alert;
    a display coupled the processor, the display operable to—
        provide a visual indication of the status input prompt, and
        provide a visual indication of the generated alert comprising a flashing message selected from the group consisting of user contact information, user medical information, first responder instructions, suggested user actions, and combinations thereof; and
    a housing to house at least portions of the location determining component, the memory, the processor, and the display, the housing operable to be affixed to the user's arm.

14. The device of claim 13, wherein the processor is operable to couple with a heart rate monitor to acquire a user heart rate and generate the alert utilizing both the geographic location comparison and the acquired heart rate.

15. The device of claim 13, further including a speaker coupled with the processor, the speaker operable to provide an audible indication of the generated alert.

16. The device of claim 13, wherein the user input is further operable to receive a mode input from the user and the processor generates the alert based upon the geographic location comparison only when the mode input corresponds to an exercise mode.

17. The device of claim 13, further including a communications element coupled with the processor and operable to communicate with a communications network to provide an indication of the alert to a device coupled with the communications network.

18. The device of claim 13, further including a communications element coupled with the processor and operable to directly communicate with a cellular phone to instruct the cellular phone to call a predetermined phone number to provide an indication of the alert.

19. The device of claim 13, wherein the device takes action to conserve power once the alert is generated.

20. A wearable navigation device comprising:
a location determining component, comprising a GPS receiver, operable to determine a current geographic location of the device;
a memory operable to store data corresponding to a previous geographic location of the device;
a user interface operable to receive a status input from a user;
a processor coupled with the location determining component, the memory, and the user interface, the processor operable to
confirm that the device is in an exercise mode,
compare the current geographic location of the device to the previous geographic location of the device to determine if the device has moved less than a predetermined range over a predetermined interval,
if the device has moved less than a predetermined range over a predetermined interval, generate a prompt for the status input,
if the status input is not received within a predetermined time after prompting, generate an alert, and
take action to conserve power once the alert is generated;
a display coupled the processor, the display operable to—
provide a visual indication of the status input prompt, and
provide a visual indication of the generated alert comprising a flashing message;
a speaker coupled with the processor, the speaker operable to provide an audible indication of the generated alert; and
a housing to house at least portions of the location determining component, the memory, the processor, and the display, the housing operable to be affixed to the user's arm.

\* \* \* \* \*